July 26, 1960     P. RENAUT     2,946,904
ULTRASONIC TRANSDUCER ARRANGEMENT FOR SENDING AND RECEIVING
Filed March 11, 1957
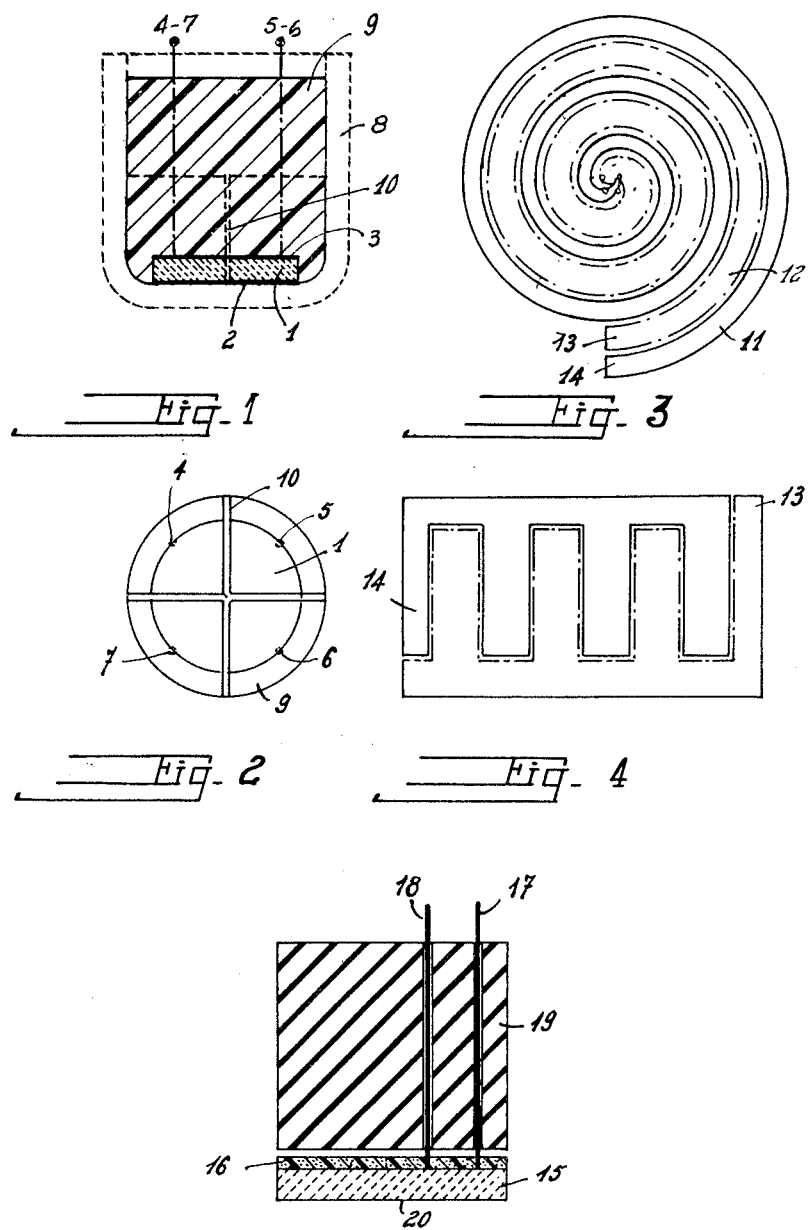

United States Patent Office 2,946,904
Patented July 26, 1960

2,946,904
ULTRASONIC TRANSDUCER ARRANGEMENT FOR SENDING AND RECEIVING

Paul Renaut, Saint-Maur, France, assignor to Réalisations Ultrasoniques, Saint-Maur, France, a corporation Filed Mar. 11, 1957, Ser. No. 645,218

Claims priority, application France Mar. 14, 1956

2 Claims. (Cl. 310—8.2)

The present invention relates to electro-acoustic transducers for testing solid materials or parts by means of elastic vibrations.

It is known that examination of a solid part may be effected by transmission therethrough, by means of one or a plurality of electro-acoustic transducers, in contact with one face thereof, of elastic vibrations, ultrasonic, for instance; according to the so-called "reflection method," said vibrations are picked up on said contact face after transmission within the solid piece and reflection on a reflecting surface thereof.

It is well understood that the use of a plurality of transducers located at a short distance from each other, certain of them acting as transmitters and other as receivers has the advantage, because of the fact that the contact area of a transmitting transducer with the test piece may be, in this case, very close to the contact area of the receiving transducer which picks up the corresponding back-reflected-beam of ultrasonic vibrations, of "illuminating" portions located within the test piece at a small depth from said contact surface. Of course, the smaller are the transducers, the better is the assimilation of their operation to that of an omnidirectional source of radiation: it is therefore highly desirable, for "illuminating" as completely as possible said surface portions of the test piece, which are very difficult to reach, to use a great number of small transducers and placing nearly side by side their transmitting surfaces (however, it is necessary to provide an acoustic isolation between them). It is known that a plurality of small sources of radiation—either electro-magnetic or electro-acoustic—when fed in phase, or with suitable differences in phase, are equivalent to a single source having the required radiation pattern. Such a source would moreover present, over a single transmitter-receiver transducer, the following important advantage: while the operation of the latter single transducer is disturbed by the spurious echoes which arise because of the comparatively long damping period of the transmitted oscillations, on the contrary, none of the receiving transducers which form the composite source, so long as it is mechanically isolated from the other parts of the source, is "dazzled" by the beam transmitted by the adjacent transducers.

However, practical working of the above principles is difficult and has not been tried until now to a large extent.

Particularly, it is very difficult, starting with a plurality of individual transducers, to assemble them rigidly so as to obtain strictly parallel transmitting surfaces. Besides, complicated structures in which the transmitting and receiving surfaces of the various transducers are closely imbricated are very difficult to build through assembling of individual parts.

One object of the invention is a process for making transducer arrangements free of the above disadvantages.

The invention further relates to transducer arrangements obtained by means of such a process. Another object of the invention to provide transducer arrangements the transmitting and the receiving surfaces of which are closely imbricated.

The process according to the invention essentially consists in cutting a block of piezo-electrical material into several portions which are acoustically and electrically isolated, yet being rigidly assembled.

This process may further comprise the following features, taken either separately or in any combination thereof:

(1) Said block of piezo-electrical material, preferably ceramic, once suitably metallized and provided with connecting leads, is positioned in a mould into which a damping material is then poured so as to coat at least the face of the transducer block opposite to its transmitting face; the damping material hardens and the coated block is withdrawn from the mould and cut out.

(2) The cutting operation is preferably effected by means of a machining apparatus using ultrasonic vibrations.

(3) The parts of the cut out piezo-electrical block are separated from each other in order to provide acoustical isolation of the individual transducers, only the damping coating material not being completely cut asunder, so as to provide mechanical connection between the transducers which thus remain assembled in an integral block.

(4) In the slots between the various transducer elements of the transducer block, there is poured a material having high absorption power with respect to ultrasonic waves.

(5) The connecting leads are pegged out into a layer of conducting material sticking to the suitable face of the ceramic block, this conducting material being hardened after positioning of the connections.

(6) Before making of the transducer arrangement, the surfaces of the ceramic block are corrugated or otherwise made irregular, preferably by means of a machining apparatus using ultrasonic vibrations.

The transducer arrangement, obtained through the above method, preferably consists of a plurality of elements, placed side by side in such a manner that a transmitting element alternates with a receiving element, said elements being acoustically and electrically isolated from each other, either by the air gap resulting from their being cut out from a single piezo-electrical ceramic block, or with the assistance of an absorbent substance poured into the gap, and, besides, of a damping block into which they are at least partially embedded, the damping material surrounding the connecting leads and providing for rigid mounting of the assembly.

According to preferred embodiments of the invention, the transducer arrangement comprises closely imbricated receiving and transmitting elements, such as: alternate spiral-wound strips, intermeshing comb-shaped structure, etc.

The invention will be more clearly understood from the following description, when read in conjunction with the annexed drawing, in which:

Fig. 1 is a sectional view of a transducer block according to the invention, before withdrawing from the mould and cutting out the individual transducers;

Fig. 2 is a bottom view of said transducer block, once cut out;

Figs. 3 and 4 are schematic views of modified embodiments;

Fig. 5 illustrates a particular mode of securing the connecting leads.

Referring more particularly now to Figs. 1 and 2, which illustrate a non-limiting manner of carrying into effect the process according to the invention: a cylindrical piezo-electrical ceramic block 1 is metallized (for instance with silver) on its faces 2 and 3.

Four connecting leads, at right angles with respect to the metallized faces, are welded at points 4, 5, 6, 7 of the metallized surface 3. The ceramic block is then positioned into a mould 8 (shown in dotted line in Fig. 1), face 1 bearing on the bottom of the mould. There is poured on the ceramic a suitable damping substance which, when hardening, forms a block 9 which embeds the leads, and closely fits over the side and base 3 of cylindrical block 1 (in certain cases, a thin layer of the damping substance is applied on face 2). After withdrawing from the mould, the assembly (1, 9) is cut out, beginning with face 2 and cutting at right angles with respect to this face, as shown in Fig. 2, so as to obtain four entirely separated parts.

The cutting operation proceeds, in a direction at right angles with respect to face 3, further than said face, for instance along the dotted line 10, shown in Fig. 6: thus, block 9 is cut out deeply enough to provide good acoustical isolation between the four transducer elements, while keeping a good mechanical rigidity for the transducer assembly.

The transducer arrangement thus obtained comprises two transmitter elements 4, 6 and two receiver elements 5, 7. Of course it is possible to build, according to the above described method, transducer arrangements comprising a great number of individual elements of a great variety of shapes, this being made easier when the block is cut with the assistance of a machining apparatus using ultrasonic vibrations.

Fig. 3 shows a transducer consisting of two elements in the shape of intermeshed spirals 11 and 12. Such a transducer cannot be actually built but by means of the method according to the invention.

Close intermeshing of the transmitting and receiving surfaces thus obtained allows illuminating as completely as possible the areas located at a small depth from the surface of the test piece. The arrangement shown in Fig. 4, according to which two transducer elements are in the shape of intermeshed combs, may be obtained from a rectangular ceramic block. These embodiments have, over arrangements in which the transducers should be comprised of transducer bars placed side by side along their length or of concentrical ring-shaped transducers, the advantage of requiring only two connections, and, consequently, two welding points (13 and 14, Figures 3 and 4).

It is remarked that welding connecting leads to the metallized face of the transducer is a rather difficult operation. Moreover, at the welding points direct contact no longer exists between the ceramic and the damping material, and, therefore, spurious reflections are liable to arise at such points.

The arrangement illustrated in Fig. 5 does not present such drawbacks, and is therefore preferred for building transducer arrangements comprising a great number of elements.

According to this modified arrangement, the piezo-electrical ceramic block 15 is first covered, on one face, with a layer of a conductive substance sticking to ceramic, thick enough and sufficiently soft, during a first step of the process, to allow pegging out of the end of the connecting leads, such as 17, 18, into said layer, and capable of hardening in a second step of the process, so as to retain said leads, which are thus affixed thereto at right angles with respect to the faces of the ceramic block. To this end, there may be used for instance a synthetic resin which has been rendered conductive by introducing therein powdered silver: after pegging out of the leads, this resin is hardened by a heat treatment of by addition of a hardening substance.

Positioning of the leads is made easier due to the isolating plate or block 19, which is provided with internal tubing through which the leads are guided, and the tubing being withdrawn once the leads have been properly positioned. In certain cases it may be desirable to lodge each lead within a tubular screen, in metal foil for instance.

The ceramic block is then placed in a mould of the type shown in Fig. 1, and having damping properties with respect to ultrasonic vibrations, such as for instance the synthetic ethoxylin resin commonly known under the trade name "Araldite," is poured on the ceramic block into the mould. The transducer arrangement thus obtained is as shown in Fig. 1, and comprises a ceramic block partly embedded in a block the function of which is to damp the ultrasonic vibrations on the face on which the connecting leads are attached. The block is cut out around the leads so as to obtain the desired number of transducer elements, the latter still remaining assembled, the slots between them not completely cutting asunder the damping block.

After cutting out of the transducer block, the slots are preferably filled with a material having a high absorbing power with respect to ultrasonic vibrations, for instance a mixture of "Araldite" and sawdust, powdered cork or rubber, etc., which is inserted on face 20 (Fig. 5).

Face 20 is thereafter polished and rendered conductive by proper coating: face 20 is then the transmitting (and receiving) surface of the transducer.

It is further possible to improve ultrasonic damping by giving a coarse grain to both faces of the ceramic block, or making asperities, corrugations, scratches, or the like, with the assistance of an ultrasonic machining apparatus.

Thereafter, the operation of pegging out conducting loads, and other steps hereinabove described, are carried on. Moreover it may be desirable, more completely to isolate two adjacent elements of the transducer arrangement, namely, a transmitter and a receiver element, respectively, to bias them by means of direct current voltages of opposite polarities. The electric field which could be induced from the transmitter to the receiver element would then produce, in the latter element, elastic vibrations in phase opposition with respect to the vibrations generated by the transmitter element: therefore, said induced vibrations would then compensate, in the receiver element, for the vibrations from the transmitting element which are applied to the receiving element through undesirable mechanical coupling between the two elements.

Another method for avoiding the small spurious echoes resulting from a small residual electric coupling between a receiver and a transmitter element in the transducer arrangement according to the invention, basically consists in cancelling the piezo-electric properties of the transmitting element out of the transmitting periods thereof. To this end, there may be applied, out of said transmitting periods, a direct-current electric field having an intensity high enough for saturating the ceramic.

Another solution to this problem consists in selecting a ceramic material without remanent polarization: it is then necessary properly to bias the ceramic during transmitting and receiving periods, by means of a direct-current electric field, which is, during the transmitting periods, exclusively applied to the transmitting elements, and, during the receiving periods, exclusively applied to the receiving elements.

It must be understood that the invention is in no way limited to the above described embodiments: for instance, another piezo-electrical material could be used instead of ceramic without departing from the spirit of the invention. However, it must be pointed out that a quartz crystal is difficult properly to cut out. Moreover, as a quartz crystal operates at high impedance, and, therefore, with high voltages, electrical insulation would be, in this case, comparatively difficult to obtain between the transmitting and receiving elements of the transducer.

The shapes and dimensions of the structures shown, the arrangement of the connecting leads, the materials used for damping are in no way limiting. Though the invention has been illustrated as applied to transducers, it could be equally applied to other ultrasonic devices, such as acoustic prisms which are often placed between the transducer and the test piece, so as to modify the angle of incidence of the ultrasonic beam with respect to the test piece. Such a prism could be cut out at the same time and according to the same method which is applied to the cooperating transducer.

What I claim is:

1. A transducer unit comprising a plurality of juxtaposed alternating transmitting and receiving elements separated from each other by at least one groove, the transducer unit essentially consisting of a first and a second block, respectively made of a piezo-electrical material and of a material having damping properties with respect to elastic vibrations, and having two sides in contact with each other, each of said grooves extending through said first block and penetrating into said second block along a portion thereof across said contact sides.

2. A transducer unit comprising a plurality of juxtaposed alternating transmitting and receiving elements separated from each other by at least one groove, the transducer unit essentially consisting of a first and a second block, respectively made of a piezo-electrical material and of a material having damping properties with respect to elastic vibrations, and having two sides in contact with each other, each of said grooves extending through said first block and penetrating into said second block along a portion thereof across said contact sides and substantially normally thereto.

References Cited in the file of this patent

UNITED STATES PATENTS

| | | |
|---|---|---|
| 1,990,882 | Goldsteine | Feb. 12, 1935 |
| 2,284,088 | Gerber | May 26, 1942 |
| 2,415,832 | Mason | Feb. 18, 1947 |
| 2,420,864 | Chilowsky | May 20, 1947 |
| 2,484,626 | Keller | Oct. 11, 1949 |
| 2,486,560 | Gray | Nov. 1, 1949 |
| 2,497,680 | Massa | Feb. 14, 1950 |
| 2,589,403 | Kurie | Mar. 18, 1952 |
| 2,628,335 | Drake | Feb. 10, 1953 |
| 2,784,325 | Holliday et al. | Mar. 5, 1957 |
| 2,810,082 | Tibbetts | Oct. 15, 1957 |